US012165323B1

United States Patent
Amar et al.

(10) Patent No.: US 12,165,323 B1
(45) Date of Patent: Dec. 10, 2024

(54) LIVER FAT QUANTIFICATION FROM DEXA DATA

(71) Applicant: Insitro, Inc., South San Francisco, CA (US)

(72) Inventors: David Amar, Sunnyvale, CA (US); Jack Albright, Los Altos, CA (US); Christopher Probert, Mill Valley, CA (US); Sumit Mukherjee, Issaquah, WA (US); Daphne Koller, Portola Valley, CA (US)

(73) Assignee: INSITRO, INC., South San Francisco, CA (US)

( * ) Notice: Subject to any disclaimer, the term of this patent is extended or adjusted under 35 U.S.C. 154(b) by 0 days.

(21) Appl. No.: 18/407,289

(22) Filed: Jan. 8, 2024

Related U.S. Application Data

(60) Provisional application No. 63/545,135, filed on Oct. 20, 2023.

(51) Int. Cl.
*G06T 7/00* (2017.01)
(52) U.S. Cl.
CPC .. *G06T 7/0014* (2013.01); *G06T 2207/10088* (2013.01); *G06T 2207/10116* (2013.01); *G06T 2207/20081* (2013.01); *G06T 2207/20132* (2013.01); *G06T 2207/30056* (2013.01)

(58) Field of Classification Search
None
See application file for complete search history.

(56) References Cited

U.S. PATENT DOCUMENTS

| | | | | |
|---|---|---|---|---|
| 2013/0287168 | A1* | 10/2013 | Payne | A61B 6/5205 378/53 |
| 2023/0021926 | A1* | 1/2023 | Zhao | G06N 3/08 |
| 2023/0394668 | A1* | 12/2023 | Donovan | G16H 30/20 |

FOREIGN PATENT DOCUMENTS

| | | | |
|---|---|---|---|
| CN | 106295205 A | * | 1/2017 |
| CN | 108324244 A | * | 7/2018 |
| CN | 112370040 A | * | 2/2021 |

(Continued)

OTHER PUBLICATIONS

S. Masoudi, S. M. Anwar, S. A. Harmon, P. L. Choyke, B. Turkbey and U. Bagci, "Adipose Tissue Segmentation in Unlabeled Abdomen MRI using Cross Modality Domain Adaptation," 2020 42nd Annual International Conference of the IEEE Engineering in Medicine & Biology Society (EMBC), Montreal, QC, Canada, 2020, pp. 1624-1.*

(Continued)

*Primary Examiner* — Jiangeng Sun
(74) *Attorney, Agent, or Firm* — MORRISON & FOERSTER LLP

(57) ABSTRACT

An exemplary method for predicting one or more adipose depots for a patient includes receiving one or more Dual-energy X-ray Absorptiometry (DEXA) scans comprising at least a portion of a torso of the patient; providing at least one or more portions of the one or more DEXA scans to a trained machine-learning model, wherein the machine-learning model is trained using a training dataset comprising: a plurality of training DEXA scans of a plurality of subjects and a plurality of corresponding Magnetic Resonance Imaging (MRI)-image-based adiposity scores of the plurality of subjects; and predicting the one or more adipose depots for the patient utilizing the trained machine-learning model.

20 Claims, 9 Drawing Sheets

(56) References Cited

FOREIGN PATENT DOCUMENTS

| WO | WO-2012092533 A1 | * | 7/2012 | ............. A61B 6/469 |
| WO | WO-2019211307 A1 | * | 11/2019 | ........... A61N 5/1039 |
| WO | WO-2020056196 A1 | * | 3/2020 | ........... G06T 7/0012 |
| WO | WO-2022040375 A1 | * | 2/2022 | ................ A61P 3/00 |
| WO | WO-2022140712 A1 | * | 6/2022 | ............. A61B 5/004 |
| WO | WO-2023076382 A1 | * | 5/2023 | |

OTHER PUBLICATIONS

Bazzocchi et al., (2014). "Liver in the Analysis of Body Composition by Dual-Energy X-ray Absorptiometry," Br J Radiol, 87(1041:20140232, 11 pages.

Bouchi et al., (2016). "Clinical Relevance of Dual-Energy X-ray Absorptiometry (DXA) as a Simultaneous Evaluation of Fatty Liver Disease and Atherosclerosis in Patients with Type 2 Diabetes," Cardiovasc. Diabetol., 15:64, 9 pages.

Haas et al., (2021). "Machine learning enables new insights into genetic contributions to liver fat accumulation," Cell Genom, 1(3):100066, 22 pages.

Langner et al., (2020). "Large-Scale Inference of Liver Fat with Neural Networks on UK Biobank Body MRI," Medical Image Computing and Computer Assisted Intervention—MICCAI 2020, 602-611, 10 pages.

Miao et al., (2022). "Identification of 90 NAFLD GWAS loci and establishment of NAFLD PRS and causal role of NAFLD in coronary artery disease," HGG Adv, 3(1):100056, 11 pages.

Mouchti et al., (2023). "Assessment of correlation between conventional anthropometric and imaging-derived measures of body fat composition: a systematic literature review and meta-analysis of observational studies," BMC Med. Imaging, 23:127, 11 pages.

Song et al., (2022). "Equations for Predicting DXA-Measured Visceral Adipose Tissue Mass Based on BMI or Weight in Adults," Lipids Health Dis., 21(1):45, 9 pages.

Tan et al., (2022). "DEXA Scan Body Fat Mass Distribution in Obese and Non-Obese Individuals and Risk of NAFLD-Analysis of 10,865 Individuals," J. clin med, 11(20):6205, 12 pages.

Wilman et al., (2017). "Characterization of Liver Fat in the UK Biobank Cohort," PLOS ONE, 12(2):e0172921, 14 pages.

Sveinbjornsson et al., (2022). "Multiomics study of nonalcoholic fatty liver disease," Nature Genetics, 54:1652-1663.

* cited by examiner

```
┌─────────────────────────────────────────────────────────────┐
│ receiving one or more Dual-energy X-ray Absorptiometry      │
│ (DEXA) scans comprising at least a portion of a torso of    │
│ the patient                                                  │
│ 102                                                          │
└─────────────────────────────────────────────────────────────┘
                              │
                              ▼
┌─────────────────────────────────────────────────────────────┐
│ providing at least one or more portions of the one or more  │
│ DEXA scans to a trained machine-learning model, wherein     │
│ the machine-learning model is trained using a training      │
│ dataset comprising: a plurality of training DEXA scans of a │
│ plurality of subjects and a plurality of corresponding      │
│ Magnetic Resonance Imaging (MRI)-image-based adiposity      │
│ scores of the plurality of subjects                         │
│ 104                                                          │
└─────────────────────────────────────────────────────────────┘
                              │
                              ▼
┌─────────────────────────────────────────────────────────────┐
│ predicting one or more adipose depots for the patient       │
│ utilizing the trained machine-learning model                │
│ 106                                                          │
└─────────────────────────────────────────────────────────────┘
                              │
                              ▼
┌─────────────────────────────────────────────────────────────┐
│ outputting an estimated liver fat score (e.g., PDFF), an    │
│ estimated Visceral adipose tissue (VAT) score, an estimated │
│ subcutaneous adipose tissue (SAT) score, an estimated       │
│ GFAT score, or any combination thereof                      │
│ 108                                                          │
└─────────────────────────────────────────────────────────────┘
                              │
                              ▼
┌─────────────────────────────────────────────────────────────┐
│ obtaining a diagnosis of a disease based on the predicted   │
│ one or more adipose depots of the patient                   │
│ 110                                                          │
└─────────────────────────────────────────────────────────────┘
                              │
                              ▼
┌─────────────────────────────────────────────────────────────┐
│ monitoring a progression of the disease based on the        │
│ predicted one or more adipose depots of the patient         │
│ 112                                                          │
└─────────────────────────────────────────────────────────────┘
                              │
                              ▼
┌─────────────────────────────────────────────────────────────┐
│ identifying a treatment for the patient based on the        │
│ predicted one or more adipose depots of the patient         │
│ 114                                                          │
└─────────────────────────────────────────────────────────────┘
```

FIG. 1

LIVER FAT QUANTIFICATION FROM DEXA DATA

CROSS REFERENCE TO RELATED APPLICATIONS

This application claims the priority benefit of U.S. Provisional Application No. 63/545,135, filed Oct. 20, 2023, which is incorporated herein by reference in its entirety.

This disclosure relates generally to medical image processing and more specifically to machine-learning techniques for quantitative analysis of medical image data.

BACKGROUND

Hepatic steatosis refers to the accumulation of fats in the liver and is a key characteristic of Non-Alcoholic Fatty Liver Disease (NAFLD), a common liver disorder that affects approximately 25% of the global population. NAFLD can progress to more severe liver diseases such as cirrhosis and liver cancer if left untreated. Proton Density Fat Fraction (PDFF) is a non-invasive imaging biomarker used to quantify liver fat. It is a reliable and accurate method for assessing hepatic steatosis, making it a valuable tool in the diagnosis and monitoring of NAFLD.

However, PDFF is typically calculated using advanced imaging techniques such as Magnetic Resonance Imaging (MRI), which can be expensive. The process involves separating the fat and water components of the signal and estimating the proportion of the fat signal relative to the total signal (fat+water). The cost associated with MRI can be a significant barrier, especially for routine monitoring of liver fat content in patients with NAFLD. Moreover, these imaging procedures can be time-consuming. The process involves not just the time taken for the scan itself, but also the time required for patient preparation, image acquisition, and post-processing of the images for PDFF calculation. These economic and temporal barriers can limit the feasibility of using PDFF measurements in large-scale population screenings or in settings where quick results are needed.

Dual-energy X-ray absorptiometry (DEXA) scans use two different X-ray energies to estimate bone density and body composition, including fat and muscle mass. DEXA scans are commonly used in medical settings to diagnose osteoporosis and assess fracture risk, but they can also provide valuable information about overall body composition. Compared to MRI, DEXA scans are generally cheaper, accessible en masse, and are easier to obtain. However, while DEXA scans are useful for assessing overall body composition, they do not provide the same level of detail or specificity as an MRI. DEXA scans cannot provide a detailed image of the liver, and thus are largely believed to provide limited information about liver fat as compared to MRI-derived PDFF.

Recent studies have attempted to obtain liver fat measurements from DEXA scans, with limited success. Bazzocchi et al. (2014) presented a case-control study of patients with steatosis to patients without (n=90 in each group). Analysis of the fat mass in six liver-associated regions of interest reached AUCs of 0.82+0.032. See A. Bazzocchi, et al., *Liver in the Analysis of Body Composition by Dual-Energy X-ray Absorptiometry,* 87 Brit. J. Radiology 1041, (2014), https://doi.org/10.1259/bjr.20140232. Bouchi et al. (2016) compared the DEXA-derived android-to-gynoid (A/G) ratio to liver attenuation index (LAI) assessed by abdominal computed tomography and observed a significant association between A/G and LAI in a small cohort of diabetes patients (n=259). A/G ratio was associated with LAI even after adjusting for BMI and liver enzymes. See Ryotaro Bouchi et al., *Clinical Relevance of Dual-Energy X-ray Absorptiometry (DXA) as a Simultaneous Evaluation of Fatty Liver Disease and Atherosclerosis in Patients with Type 2 Diabetes,* 15 Cardiovasc. Diabetol. 64 (2016), https://doi.org/10.1186/s12933-016-0384-7. Recently, Tan et al. (2022) examined NAFLD risk in 10,865 non-obese and 16,487 obese individuals using regional fat percentage scores. Multivariate logistic regression analysis, accounting for age, race, BMI, and diabetic status, showed increased NAFLD risk with regional fat percentage in both obese and non-obese subjects. Specifically, trunk fat manifested the strongest association, whereas leg and gynoid were the weakest predictors. See Caitlyn Tan, et al., *DEXA Scan Body Fat Mass Distribution in Obese and Non—Obese Individuals and Risk of NAFLD-Analysis of* 10,865 *Individuals,* 11 J. Clin. Med. 6205 (2022), https://doi.org/10.3390/jcm11206205. Further, Song et al. (2022) observed a significant correlation between DEXA-derived visceral adipose tissue (VAT) mass and hepatic steatosis measured using ultrasound (r=0.53, p<0.005). See Xuan Song, et al., *Equations for Predicting DXA-Measured Visceral Adipose Tissue Mass Based on BMI or Weight in Adults,* 21 Lipids Health Dis. 45 (2022), https://doi.org/10.1186/s12944-022-01652-8. However, the studies were limited by: (1) small sample sizes, (2) reporting the results on a training set without having a proper test set, (3) typically requiring manual curation steps when analyzing the DEXA scans, (4) modest performance, and/or (5) lack of PDFF scores in the cohort as a way to compare the DEXA scans to MRI, which can also avoid dichotomic case-control separation of the subjects.

SUMMARY

Described herein are systems, methods, devices, and non-transitory computer readable storage media, and apparatuses directed generally to predicting adipose depots (e.g., liver fat in the liver) for a patient based on X-ray data such as Dual-energy X-ray absorptiometry (DEXA) scan images, and more specifically to inputting DEXA scan images for a patient into a trained machine-learning model to predict the patient's adipose content. In an exemplary system, DEXA scans that include at least a portion of a patient's torso can be input into one or more trained machine-learning models to obtain adipose depots (e.g., liver fat) predictions. In some embodiments, the machine-learning models have been trained based on DEXA scan data and corresponding adiposity scores, such as PDFF scores, which may be determined based on Magnetic Resonance Imaging data.

DEXA scans use two different X-ray energies to estimate bone density and body composition, including fat and muscle mass, and are commonly believed to be unsuitable for detailed analysis of adipose depot (e.g., liver fat) content. However, the systems and methods disclosed herein have overcome the traditional limitations of DEXA scan image analysis by training machine-learning models to predict fat content using DEXA scan data. In contrast to the limitations of the studies described above, the machine-learning techniques described herein may be trained on a relatively larger data set. Adiposity scores including PDFF scores corresponding to various subjects, together with additional adiposity scores (e.g., VAT and SAT), may be determined based on Magnetic Resonance Imaging data and be used as training data, testing data, and/or validation data for the machine-learning model. As a result, accurate predictive models that do not require manual annotation of the input images were achieved. Further, results from masking studies, in which an area of the images in the training set and the validation set is "masked" or removed from the training data, demonstrate that higher performance in liver fat prediction is obtained from the machine-learning models disclosed herein when the liver area of a DEXA scan is retained in the images input to the model(s). Thus, the liver portion of the DEXA scan is important in the model's prediction of a patient's liver fat, indicating that the models are not merely predicting high liver fat content based on an overall body fat content, but rather specifically evaluating the liver portion of the input images in determining the liver fat content.

In some embodiments, the DEXA scans used to train the machine-learning models described herein include one or more image portions, and each image portion may be received by a specific channel of the machine-learning models. For instance, a DEXA scan may include a first portion obtained at a first X-ray energy level targeting soft tissue such as fat and muscle, a second portion obtained at a second X-ray energy level targeting hard (e.g., calcified) tissue such as bone, and a third portion obtained by modifying and/or combining one or both of the first and second portion (e.g., taking the average of the first and second portion). The machine-learning models may include a first, second, and/or third channel configured to receive and process each of the respective portions of the DEXA scans.

In some embodiments, the training images are assigned adiposity scores including liver fat estimates (e.g., PDFF) and other adiposity measures, such as a Visceral adipose tissue (VAT) score, a subcutaneous adipose tissue (SAT) score, and a gluteofemoral (GFAT) adipose tissue score), or any combination thereof. The adiposity scores may be Magnetic Resonance Imaging (MRI)-image-based adiposity scores, such as an estimated Proton Density Fat Fraction (PDFF), assigned to a DEXA scan training image for a subject. Accordingly, the machine-learning models herein may be trained to predict liver fat when provided with DEXA scan images of a patient. Specifically, the models may be trained to predict a PDFF score based on a patient's DEXA scan. The models may also be trained to predict a patient's VAT score, SAT score, and GFAT score based on the patient's DEXA scan.

In some aspects, provided herein is a method for predicting one or more adipose depots for a patient comprises: receiving one or more Dual-energy X-ray Absorptiometry (DEXA) scans comprising at least a portion of a torso of the patient; providing at least one or more portions of the one or more DEXA scans to a trained machine-learning model, wherein the machine-learning model is trained using a training dataset comprising: a plurality of training DEXA scans of a plurality of subjects and a plurality of corresponding Magnetic Resonance Imaging (MRI)-image-based adiposity scores of the plurality of subjects; and predicting the one or more adipose depots for the patient utilizing the trained machine-learning model.

In some embodiments, the predicted one or more adipose depots for the patient comprises an estimated Proton Density Fat Fraction (PDFF) for the patient.

In some embodiments, the method further comprises: obtaining a diagnosis of a disease based on the predicted one or more adipose depots of the patient.

In some embodiments, the method further comprises: monitoring a progression of the disease based on the predicted one or more adipose depots of the patient.

In some embodiments, the disease comprises Non-Alcoholic Fatty Liver Disease (NAFLD) or Non-Alcoholic Steatohepatitis (NASH), liver cirrhosis and/or liver cancer.

In some embodiments, the one or more DEXA scans comprising at least a portion of a torso further comprise at least a portion of the head, and at least a portion of the legs of the patient.

In some embodiments, the one or more adipose depots comprises liver fat.

In some embodiments, the method further comprises: identifying a treatment for the patient based on the predicted one or more adipose depots of the patient.

In some embodiments, the trained machine-learning model comprises a trained neural network model.

In some embodiments, the trained machine-learning model comprises a Residual Neural Network (ResNet) model or an EfficientNet model.

In some embodiments, the machine-learning model is trained by: obtaining a pretrained version of the machine-learning model; and training the pretrained version of the machine-learning model using the training dataset.

In some embodiments, the MRI-image-based adiposity scores of the plurality of subjects comprise a liver fat estimate, an estimated Visceral adipose tissue (VAT) score, an estimated subcutaneous adipose tissue (SAT) score, an estimated gluteofemoral (GFAT) adipose tissue score, or any combination thereof.

In some embodiments, the MRI-image-based adiposity scores of the plurality of subjects comprise liver fat estimates.

In some embodiments, the plurality of training DEXA scans of the plurality of subjects are obtained by: obtaining a plurality of whole-body DEXA scans of the plurality of subjects; cropping a top portion and a bottom portion off each whole-body DEXA scan of the plurality of whole-body DEXA scans of the plurality of subjects; and adding noise to one or more of the plurality of cropped whole-body DEXA scans of the plurality of subjects.

In some embodiments, the noise comprises rotation, translation, or a combination thereof.

In some embodiments, the noise comprises rotation and translation.

In some embodiments, the plurality of training liver fat estimates comprises a plurality of PDFF scores for the plurality of subjects.

In some embodiments, at least one PDFF score of the plurality of PDFF scores is obtained based on an MRI image of a subject of the plurality of subjects.

In some embodiments, the at least one PDFF score of the plurality of PDFF scores is obtained by inputting the MRI image of the subject of the plurality of subjects into a trained regression model.

In some embodiments, providing at least one or more portions of the one or more DEXA scans to the trained machine-learning model comprises: receiving a first portion of a DEXA scan of the patient; receiving a second portion of the DEXA scan of the patient; obtaining a composite DEXA scan based on the first portion and the second portion of the DEXA scan; and providing the first portion of the DEXA scan, the second portion of the DEXA scan, and the composite DEXA scan across a plurality of channels of the trained machine-learning model.

In some embodiments, the portion of the torso of the patient comprises at least a liver of the patient.

In some aspects, provided herein is a non-transitory computer-readable medium storing instructions for predicting one or more adipose depots for a patient, wherein the instructions are executable by a system comprising one or more processors to cause the system to: receive one or more Dual-energy X-ray Absorptiometry (DEXA) scans comprising at least a portion of a torso of the patient; provide at least one or more portions of the one or more DEXA scans to a trained machine-learning model, wherein the machine-learning model is trained using a training dataset comprising: a plurality of training DEXA scans of a plurality of subjects and a plurality of corresponding Magnetic Resonance Imaging (MRI)-image-based adiposity scores of the plurality of subjects; and predict the one or more adipose depots for the patient utilizing the trained machine-learning model.

In some aspects, provided herein is a system for predicting one or more adipose depots for a patient, the system comprising one or more processors, memory, and one or more programs stored in the memory for execution by the one or more processors, the one or more programs including instructions that when executed by the one or more processors cause the system to: receive one or more Dual-energy X-ray Absorptiometry (DEXA) scans comprising at least a portion of a torso of the patient; provide at least one or more portions of the one or more DEXA scans to a trained machine-learning model, wherein the machine-learning model is trained using a training dataset comprising: a plurality of training DEXA scans of a plurality of subjects and a plurality of corresponding Magnetic Resonance Imaging (MRI)-image-based adiposity scores of the plurality of subjects; and predict the one or more adipose depots for the patient utilizing the trained machine-learning model.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

Various aspects of the disclosure are set forth with particularity in the appended claims. The file of this patent contains at least one drawing/photograph executed in color. Copies of this patent with color drawing(s)/photograph(s) will be provided by the Office upon request and payment of the necessary fee. A better understanding of the features and advantages of the present disclosure will be obtained by reference to the following detailed description that sets forth illustrative embodiments, in which the principles of the disclosure are utilized, and the accompanying drawings of which:

FIG. 1 illustrates an exemplary process for predicting liver fat for a patient according to some embodiments.

DETAILED DESCRIPTION

Figure 2A:
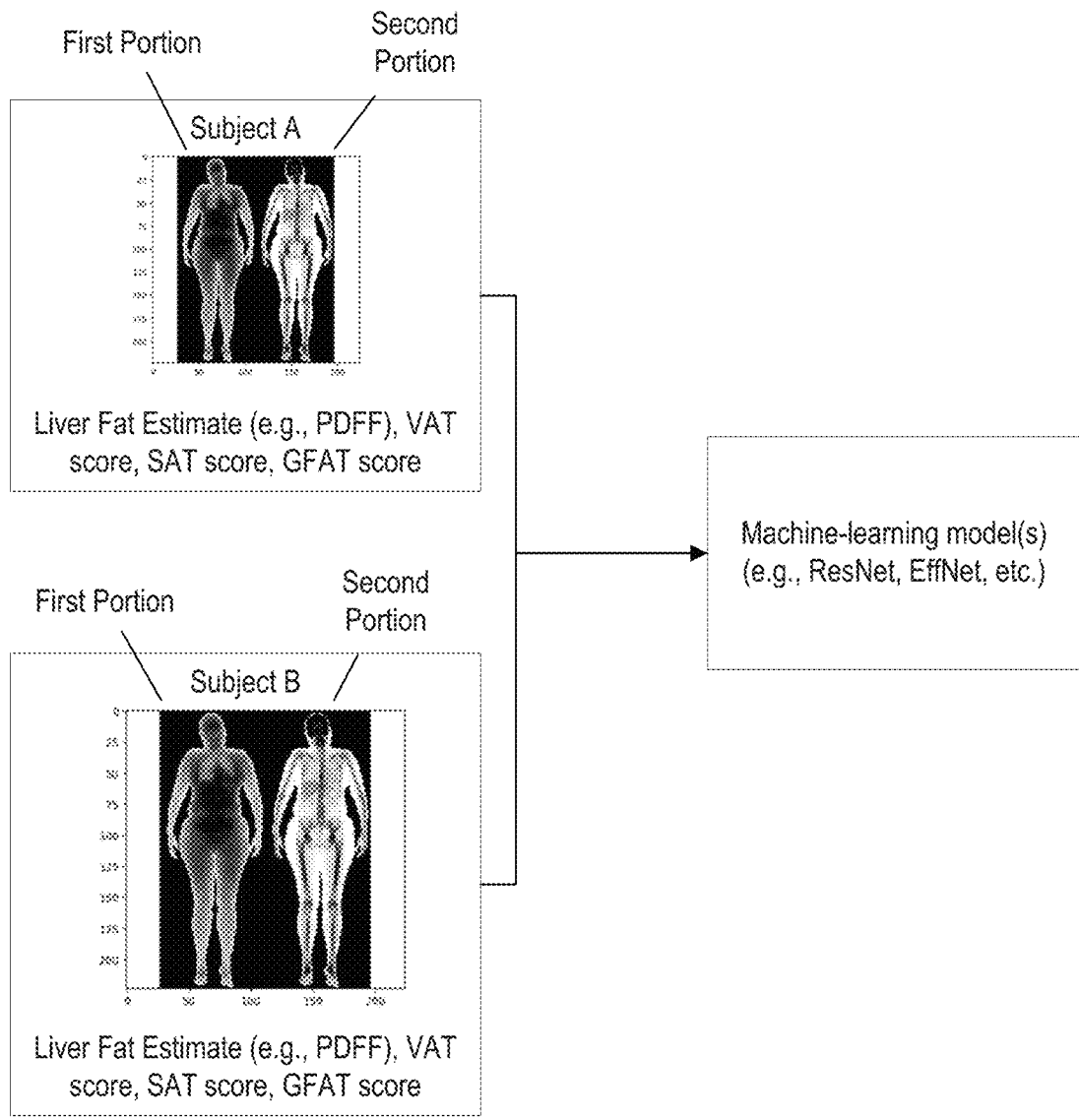
FIGS. 2A-2C illustrate exemplary training data for training a machine-learning model according to some embodiments.

Described herein are systems, methods, devices, and non-transitory computer readable storage media, and apparatuses directed generally to predicting adipose depots (e.g., liver fat) for a patient based on Dual-energy X-ray absorptiometry (DEXA) scan images, and more specifically to inputting DEXA scan images for a patient into a trained machine-learning model to predict the patient's adipose (e.g., liver fat) content. The systems and methods herein enable efficient and economic estimation of liver fat based on DEXA image data, allowing for diagnosis, monitoring, and treatment of conditions such as Non-Alcoholic Fatty Liver Disease (NAFLD) or Non-Alcoholic Steatohepatitis (NASH). An exemplary method for predicting one or more adipose depots (e.g., liver fat) includes receiving patient DEXA scans, inputting one or more portions of the DEXA scan into a machine-learning model trained based of DEXA scan image data assigned Magnetic Resonance Imaging (MRI)-image-based adiposity scores, and using the model to predict one or more adipose depots, for instance, by predicting an estimated Proton Density Fat Fraction (PDFF) for the patient.

According to some embodiments, the machine-learning models described herein are provided with DEXA scans that include one or more respective portions. For instance, a DEXA scan may include a first portion obtained at a first X-ray energy and a second portion obtained at a second X-ray energy, and a third portion obtained by altering, combining, averaging, or otherwise manipulating one or both of the first and second portion. The different X-ray energies may be more readily absorbed by different body tissues. For example, the first energy may be more readily absorbed by soft tissue such as muscle and fat, and the second energy may be more readily absorbed by hard (e.g., calcified) tissue such as bone. The amount of absorption at the two different energy levels helps to differentiate between bone and soft tissue, which may in turn guide the model in predicting fat content in different areas of the body based on the DEXA scans.

According to some embodiments, the machine-learning models herein are configured with a number of channels that corresponds to the number of portions of the DEXA scans provided to the model(s). For instance, a first channel may be configured to receive a portion of the DEXA scan obtained at the first X-ray energy level, a second channel may be configured to receive a portion of the DEXA scan obtained at the second X-ray energy level, and a third channel may be configured to receive a portion of the DEXA scan that is obtained by altering, combining, averaging, or otherwise manipulating one or both of the first and second portion. In some embodiments, the third portion may be a composite of the first and second portions. In some embodiments, the machine-learning models described herein may include fewer than three or more than three channels, corresponding to fewer than three or more than three DEXA scan portions.

According to some embodiments, the machine-learning models described herein are trained using a training dataset that includes DEXA scans obtained for a plurality of subjects and assigned corresponding adiposity scores including liver fat estimates such as a PDFF score, and other adiposity measures, such as a Visceral adipose tissue (VAT) score, a subcutaneous adipose tissue (SAT) score, a gluteofemoral (GFAT) adipose tissue score, or any combination thereof. The adiposity scores may be Magnetic Resonance Imaging (MRI)-image-based adiposity scores, such as an estimated Proton Density Fat Fraction (PDFF), assigned to a DEXA scan training image for each subject. The adiposity scores may be obtained from a database, via human evaluation of MRI images, and/or by inputting MRI images into a trained machine-learning model (e.g., regression model and/or classifier model) configured to provide an adiposity score (e.g., liver fat estimate) based on MRI data.

Accordingly, the machine-learning models herein may be trained to predict a PDFF score based on a patient's DEXA scan. The models may also be trained to predict a patient's VAT score, SAT score, and GFAT score based on the patient's DEXA scan. In some embodiments, the training DEXA scans may be pre-processed prior to training the model to improve model performance, for instance, by cropping less relevant portions of the scans (e.g., portions of the head and extremities), scaling the scans to a common size, and/or adding noise to the scans (e.g., by rotating and/or translating the scans at random). The trained machine-learning models described herein may include trained neural network models. The models may be obtained as a pretrained version of the machine-learning model, and the pretrained version of the machine-learning model may be trained/retrained using the training dataset.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

Exemplary Method

FIG. 1 illustrates an exemplary process 100 for predicting liver fat for a patient, according to some embodiments. Process 100 is performed, for example, using one or more electronic devices implementing a software platform. In some examples, process 100 is performed using one or more electronic devices. In some embodiments, process 100 is performed using a client-server system, and the blocks of process 100 are divided up in any manner between the server and one or more client devices. Thus, while portions of process 100 are described herein as being performed by particular devices, it will be appreciated that process 100 is not so limited. In process 100, some blocks are, optionally, combined, the order of some blocks is, optionally, changed, and some blocks are, optionally, omitted. In some examples, additional steps may be performed in combination with the process 100. Accordingly, the operations as illustrated (and described in greater detail below) are exemplary by nature and, as such, should not be viewed as limiting.

At block 102, an exemplary system (e.g., one or more electronic devices) receives one or more Dual-energy X-ray Absorptiometry (DEXA) scans comprising at least a portion of a torso of a patient. In some embodiments, the portion of the torso of the patient comprises at least a liver of the patient. DEXA scans may use two different X-ray energies to estimate bone density and body composition, including fat and muscle mass. The DEXA scans may therefore include one or more portions associated with the different X-ray energies. For instance, a DEXA scan may include a first portion and a second portion, the first portion corresponding to a portion of a DEXA scan obtained at a first X-ray energy and the second portion corresponding to a portion of a DEXA scan obtained at a second X-ray energy. Accordingly, the one or more DEXA scans may include a first portion primarily corresponding to bone density estimations and a second portion primarily corresponding to body composition estimations, including fat and muscle mass. In some embodiments, the DEXA scans may include a third portion obtained by forming a composite of the first and second portion. In some embodiments, the DEXA scans may include any number of portions formed by altering, combining, averaging, or otherwise manipulating the first and second portions. In some embodiments, as described further below, a machine-learning model may be configured to receive a single portion of the DEXA scan, for instance, a portion targeting soft tissue, or may be configured to receive two, three, or more portions of the DEXA scan via a plurality of processing channels.

At block 104, the exemplary system provides at least one or more portions of the one or more DEXA scans to a trained machine-learning model. In some embodiments, each portion of the DEXA scan is provided to a respective channel of the machine-learning model. Each channel may be associated with a respective processing path within the model, which may include a series of transformations, layers, and other operations for processing the respective portion of the DEXA scan. For instance, a trained machine-learning model for predicting the liver fat for a patient may include a first channel configured to receive a first portion of a DEXA scan, a second channel configured to receive a second portion of the DEXA scan, and a third channel configured to receive a third portion of the DEXA scan. In some embodiments, the machine-learning model(s) may include more or fewer than three channels corresponding to more or fewer than three portions of the DEXA scan. In some embodiments, the channels may be respectively configured with feature extraction layers for identifying and extracting important features from the respective portions of the DEXA scan. In some embodiments, the extracted features from each channel may be fused (e.g., by averaging, etc.) together and used by the model to predict the liver fat for a patient. As described above, during training, the model's configurations (e.g., weights, etc.) may be adjusted via backpropagation to minimize a loss function of the model.

In some embodiments, the machine-learning model(s) are trained using a training dataset that includes a plurality of training DEXA scans of a plurality of subjects and a plurality of corresponding Magnetic Resonance Imaging (MRI)-image-based adiposity scores (including liver fat estimates) of the plurality of subjects. In some embodiments, the plurality of training adiposity scores comprise a plurality of PDFF scores for the plurality of subjects. In some embodiments, the adiposity scores also include, for instance, a Visceral adipose tissue (VAT) score, a subcutaneous adipose tissue (SAT) score, and/or a gluteofemoral (GFAT) adipose tissue score. In some embodiments, at least one PDFF score of the plurality of PDFF scores is obtained based on an MRI image of a subject of the plurality of subjects. In some embodiments, the at least one PDFF score of the plurality of PDFF scores is obtained by inputting the MRI image of the subject of the plurality of subjects into a trained machine-learning model. In some embodiments, the trained machine-learning model is a regression model or a classifier model. In some embodiments, the at least one PDFF score of the plurality of PDFF scores is obtained at least in part by a human evaluating an MRI image of the subject, for instance as discussed in Henry R. Wilman et al., *Characterization of Liver Fat in the UK Biobank Cohort*, PLOS ONE 12(2): e0172921 (2017) https://doi.org/10.1371/journal.pone.0172921, which describes how experts manually checked MRI-images for artifacts and then defined regions of interest from which a PDFF was computed. In some embodiments, the at least one PDFF score of the plurality of PDFF scores is obtained from a database, such as the UK Biobank.

In some embodiments, the machine-learning model is trained by obtaining a pretrained version of the machine-learning model and training the pretrained version of the machine-learning model using the training dataset. In some embodiments, the trained machine-learning model includes a trained neural network model. In some embodiments, the trained machine-learning model includes a Residual Neural Network (ResNet) model or an EfficientNet model, or any other neural network suitable for the image processing described herein. In some embodiments, the trained machine-learning model is configured to output an estimated liver fat score (e.g., a PDFF score), a Visceral adipose tissue (VAT) score, an estimated subcutaneous adipose tissue (SAT) score, an estimated gluteofemoral (GFAT) adipose tissue score, or any combination thereof. In some embodiments the VAT score quantifies an amount of fat tissue stored in the abdominal cavity and surrounding internal organs. In some embodiments, the SAT score quantifies an amount of fat stored directly beneath the skin. In some embodiments the GFAT score quantifies an amount of fat stored in the thigh and gluteal regions.

In some embodiments, the plurality of training DEXA scans of the plurality of subjects are obtained by obtaining a plurality of whole-body DEXA scans of the plurality of subjects. In some embodiments, the plurality of training DEXA scans are cropped to remove a top portion and a bottom portion off each whole-body DEXA scan of the plurality of whole-body DEXA scans of the plurality of subjects. In some embodiments, noise is added to one or more of the plurality of DEXA scans of the plurality of subjects. In some embodiments, the added noise includes a rotation, a translation, or a combination thereof. For instance, each whole-body DEXA scan may be cropped to remove any portion of the scan (e.g., 10% of the overall scan from the top of the scan, 25% of the overall scan from the bottom of the scan, 50% of the overall scan, etc.). In some embodiments, each whole-body DEXA scan may be scaled up or down to a uniform scaling (e.g., 320×320 pixels). In some embodiments, each whole-body DEXA scan may be rotated by any number of degrees about any axis of rotation. Each whole-body DEXA scan may be rotated at random independently of any of the other DEXA scans (i.e., each DEXA scan may be randomly rotated by a different degree and about a different axis of rotation from any of the other DEXA scans). In some embodiments, each whole-body DEXA scan may be translated in any direction by any amount. Each whole-body DEXA scan may be translated at random independently of any of the other whole-body DEXA scans (i.e., each DEXA scan may be randomly translated by a different amount and/or in a different direction from any of the other DEXA scans). In some embodiments, adding noise to the training data may improve model performance by forcing the model(s) to recognize patterns rather than memorizing specific instances.

At block 106, the exemplary system predicts the one or more adipose depots (e.g., liver fat) for the patient utilizing the trained machine-learning model. In some embodiments, the predicted one or more adipose depots for the patient comprises an estimated Proton Density Fat Fraction (PDFF) for the patient. In some embodiments, the exemplary system additionally predicts an estimated Visceral adipose tissue (VAT) score, an estimated subcutaneous adipose tissue (SAT) score, an estimated gluteofemoral (GFAT) adipose tissue score, or any combination thereof utilizing the trained machine-learning model. As described above, in some embodiments, the VAT score quantifies an amount of fat tissue stored in the abdominal cavity and surrounding internal organs, the SAT score quantifies an amount of fat stored directly beneath the skin, and the GFAT score quantifies an amount of fat stored in the thigh and gluteal regions.

At block 108, the system outputs an estimated liver fat score (e.g., PDFF score), an estimated Visceral adipose tissue (VAT) score, an estimated subcutaneous adipose tissue (SAT) score, an estimated GFAT score, or any combination thereof. The output may be displayed on a display of an electronic device and/or output as audio from a speaker of an electronic device.

At block 110, the exemplary system and/or a physician may obtain a diagnosis of a disease based on the predicted one or more adipose depots (e.g., liver fat) of the patient. In some embodiments, the disease comprises Non-Alcoholic Fatty Liver Disease (NAFLD) or Non-Alcoholic Steatohepatitis (NASH). In some embodiments, the diagnosis is obtained by comparing the one or more adipose depots (e.g., predicted liver fat) to a threshold. For instance, NAFLD may be defined as an accumulation of fat in the liver (hepatic steatosis) in greater than 5% of liver tissue in the absence of other causes (e.g. alcohol consumption, steatogenic medication). See Henry R. Wilman et al., *Characterization of Liver Fat in the UK Biobank Cohort*, PLOS ONE 12(2): e0172921 (2017) https://doi.org/10.1371/journal.pone/0172921. In some embodiments, the diagnosis may be obtained based upon additional information including fatigue, weakness, body weight, high blood fat levels, high blood pressure, and so on. At block 112, the exemplary system and/or a physician may monitor a progression of the disease based on how the predicted liver fat of the patient changes over time. For instance, the exemplary system and/or a physician may monitor a progression from NAFLD to NASH. At block 114, the exemplary system and/or a physician may identify a treatment for the patient based on the predicted one or more adipose depots (e.g., liver fat) of the patient. For instance, a treatment may be identified based on a disease associated with the predicted liver fat (e.g., Non-Alcoholic Fatty Liver Disease (NAFLD), Non-Alcoholic Steatohepatitis (NASH), liver cirrhosis and/or liver cancer) and/or based upon the background and needs of the specific patient. In some embodiments, identified treatments may include medications, recommended behavioral changes, diet changes, and so on.

Exemplary Machine-Learning Model Training Data

The exemplary machine-learning models described herein may be trained using a dataset of full-body DEXA scans. Each of the scans may be assigned one or more adiposity scores, including a liver fat estimate (e.g., PDFF score), a VAT score, a SAT score, and/or a GFAT score, as described above. In some embodiments, the at least one PDFF score of the plurality of PDFF scores is obtained by inputting the MRI image of the subject of the plurality of subjects into a trained machine-learning model. In some embodiments, the trained machine-learning model is a regression model or a classifier model. In some embodiments, the scores may be obtained by a human evaluating an MRI image of the subject. In some embodiments, the scores may be obtained from a database, such as the UK Biobank.

Figure 2B:
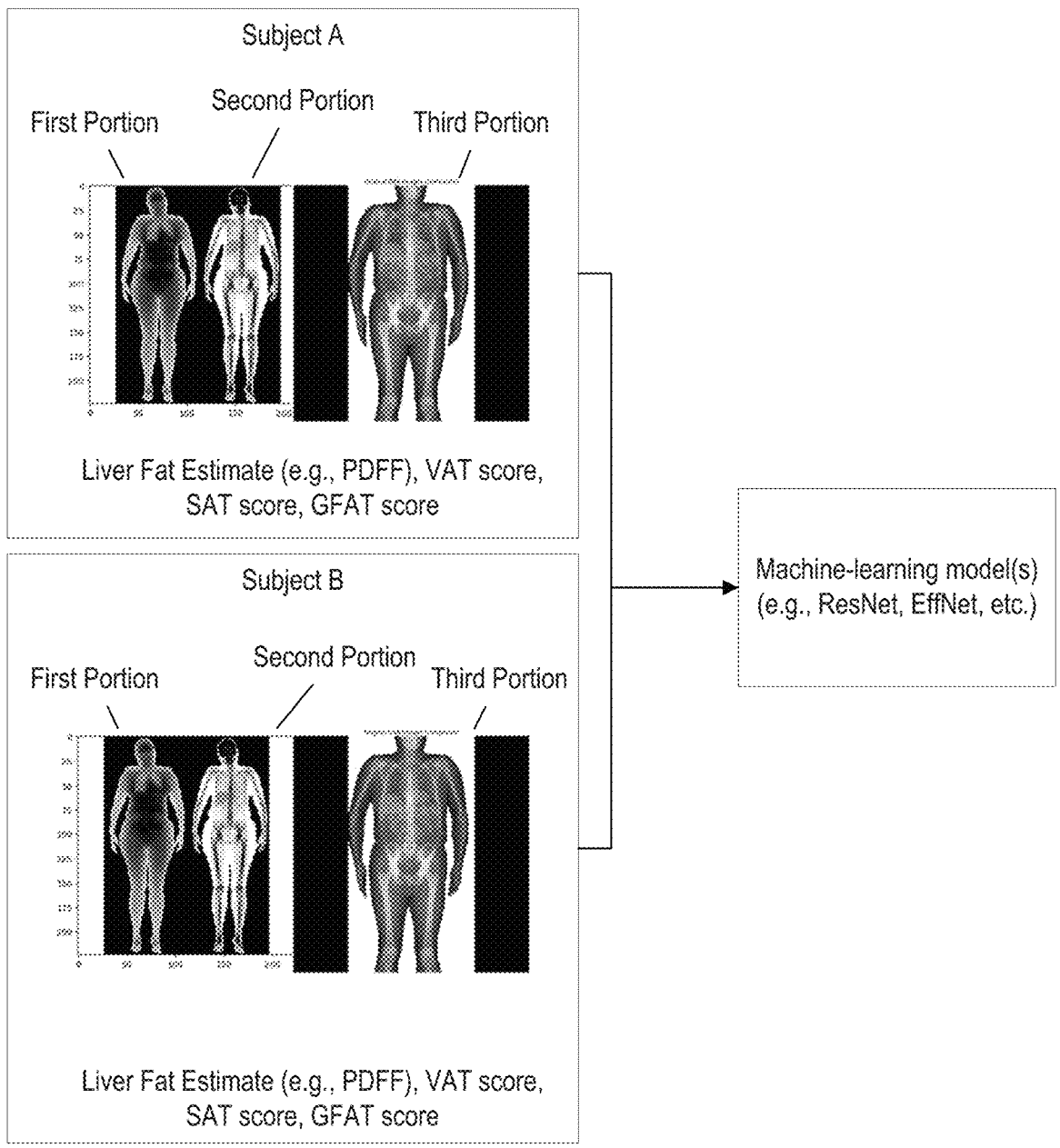
Figure 2C:
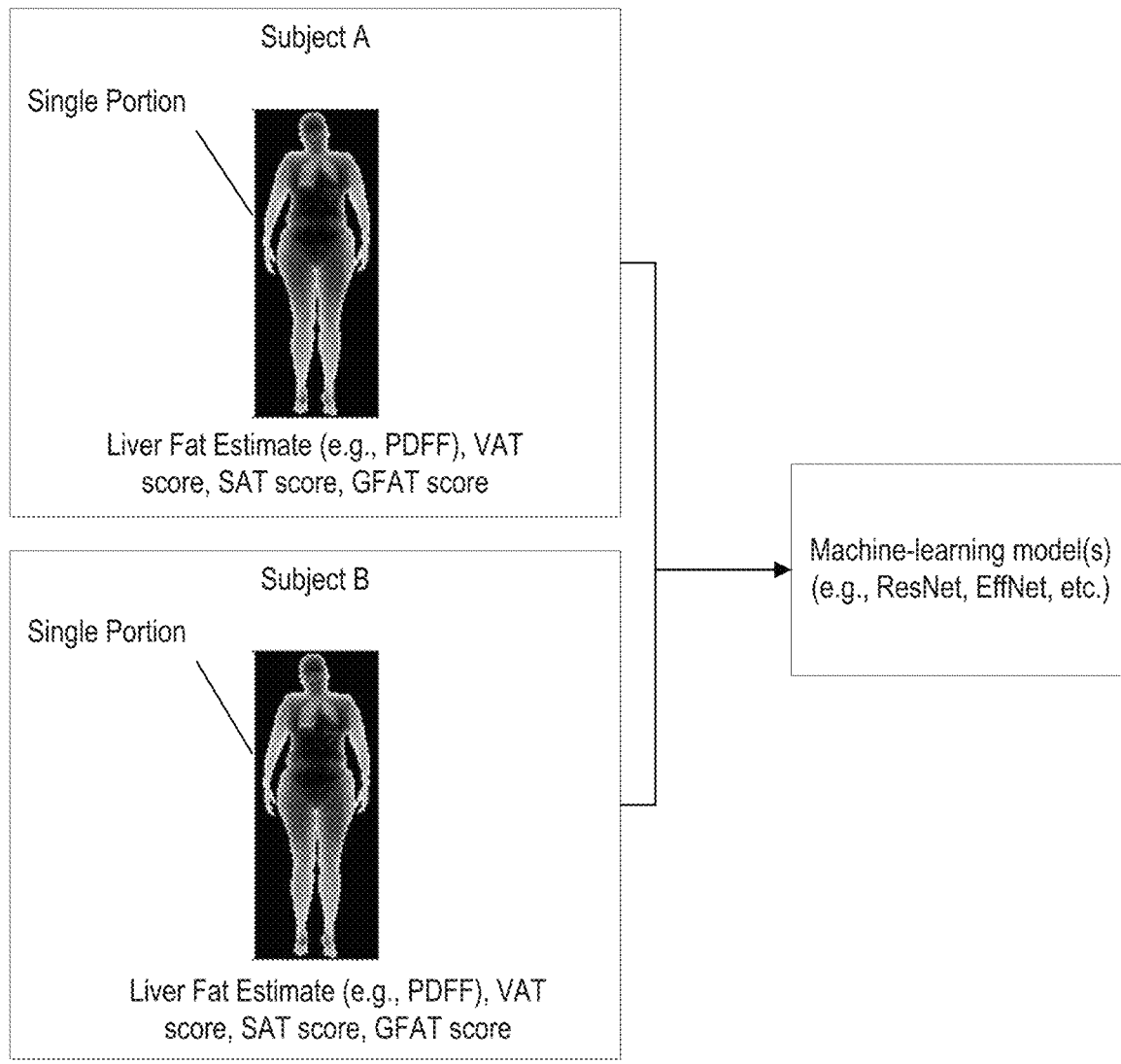

The DEXA scans and corresponding scores may used to train the machine-learning model(s) to predict one or more of the aforementioned scores when an unlabeled DEXA scan is provided to the trained model. The model may be trained to predict one or more of the aforementioned scores by training the model to minimize a loss function, such as a mean squared error (MSE) function. For example, training data comprising DEXA scans may be input into the model, the loss may be computed by comparing the model's predictions (e.g., predicted scores) with the ground-truth values, and the model's configurations may be adjusted (e.g., weights, etc.) via backpropagation. In some embodiments, the training data may be pre-processed before being input into the machine-learning model(s). For instance, portions of the DEXA scans may be cropped and/or scaled, and noise may be added to the scans (e.g., the scans may be rotated, translated, etc.). In some embodiments, the machine-learning model is trained by obtaining a pretrained version of the machine-learning model and training the pretrained version of the machine-learning model using the training dataset. FIG. 2A-2C, described in further detail below, illustrate exemplary training datasets for training a machine-learning model 302 according to some embodiments. While FIGS. 2A-2C are described with reference to a respective DEXA scan for two subjects, it should be understood that the training corpus may include DEXA scans associated with any number of individuals.

FIG. 2A illustrates a training data set in which a DEXA scan for a first subject A includes a first portion (e.g., left image) and a second portion (e.g., right image) and a DEXA scan for a second subject B includes a first portion (e.g., left image) and a second portion (e.g., right image). As described above, the first portion may correspond to a portion of a DEXA scan obtained at a first X-ray energy that is primarily absorbed by soft tissue (e.g., fat and muscle). The second portion may correspond to a portion of a DEXA scan obtained at a second X-ray energy that is absorbed more readily by hard tissue (e.g., bone) than soft tissue. For instance, lower-energy X-rays may be more readily absorbed by soft-tissue and higher-energy X-rays may be more readily absorbed by hard tissue. The DEXA scan for subject A may be associated with a first ground-truth liver fat estimate such as a first ground-truth PDFF score, and the DEXA scan for subject B may be associated with a second ground-truth liver fat estimate such as a second ground-truth PDFF score. In some embodiments, the DEXA scans for subject A and B may be associated with a ground-truth VAT score, a ground-truth SAT score, and/or a ground-truth GFAT score. In some embodiments, one or more of the ground-truth fat estimates (e.g., PDFF score, VAT score, SAT score, and/or GFAT score) are obtained from a database. In some embodiments, one or more of the ground-truth fat estimates (e.g., PDFF score, VAT score, SAT score, and/or GFAT score) are determined by a human (e.g., a physician or researcher) by evaluating MRI image data of the subject. In some embodiments, one or more of the ground-truth fat estimates (e.g., PDFF score, VAT score, SAT score, and/or GFAT score) are determined by inputting an MRI image of subject A and/or subject B into a trained regression model and/or classifier model. In some embodiments, the DEXA scans may be preprocessed according to any of the preprocessing methods described above with reference to FIG. 1 and/or below with reference to FIG. 2B (e.g., cropping, scaling, adding noise, etc.).

In some embodiments the first and second portion of the DEXA scan are provided to a respective channel of the machine-learning model. Each channel may be associated with a respective processing path within the model, which may include a series of transformations, layers, and other operations for processing the respective portion of the DEXA scan. For instance, a trained machine-learning model for predicting the liver fat for a patient may include a first and second channel respectively configured to receive the first and second portion of the DEXA scan. In some embodiments, each channel may be configured with feature extraction layers for identifying and extracting important features from the respective portions of the DEXA scan. In some embodiments, the extracted features from each channel may be fused (e.g., by averaging, etc.) together and used by the model to predict the liver fat for a patient. As described above, during training, the model's configurations (e.g., weights, etc.) may be adjusted via backpropagation to minimize a loss function of the model.

In some embodiments, the machine-learning models may include more than two channels. Accordingly, the DEXA scans used to train the models may include more than two portions to be received and processed by a respective channel of the machine-learning model. FIG. 2B illustrates a training data set in which a DEXA scan for a first subject A includes a first portion, a second portion, and a third portion, and a DEXA scan for a second subject B includes a first portion, a second portion, and a third portion. The first portion of the DEXA scan for both subject A and subject B may correspond to a portion of a DEXA scan obtained at a first X-ray energy that is primarily absorbed by soft tissue (e.g., fat and muscle). The second portion of the DEXA scan for both subject A and subject B may correspond to a portion of a DEXA scan obtained at a second X-ray energy that is absorbed more readily by hard tissue (e.g., bone) than soft tissue. The third portion of the DEXA scan for both subject A and subject B may correspond to a portion of the DEXA scan including a composite of the first and second portion of the respective scan. As described above, the third portion may be obtained by altering, combining, averaging, or otherwise manipulating one or both of the first and second portion. As described with reference to FIG. 2A, the DEXA scan for subject A may be associated with a first ground-truth liver fat estimate such as a first ground-truth PDFF score, and the DEXA scan for subject B may be associated with a second ground-truth liver fat estimate such as a second ground-truth PDFF score. In some embodiments, the DEXA scans for subject A and B may be associated with a ground-truth VAT score, a ground-truth SAT score, and/or a ground-truth GFAT score associated with the DEXA scan. In some embodiments, one or more of the ground-truth fat estimates (e.g., PDFF score, VAT score, SAT score, and/or GFAT score) are obtained from a database. In some embodiments, one or more of the ground-truth fat estimates (e.g., PDFF score, VAT score, SAT score, and/or GFAT score) are determined by a human (e.g., a physician or researcher) by evaluating MRI image data of the subject. In some embodiments, one or more of the ground-truth fat estimates (e.g., PDFF score, VAT score, SAT score, and/or GFAT score) are determined by inputting an MRI image of subject A and/or subject B into a trained regression and/or classifier model.

As described above, the DEXA scans used to train the machine-learning model(s) described herein may be preprocessed before training the models. For example, pre-processing may include cropping a top portion and a bottom portion off each whole-body DEXA scan of the plurality of whole-body DEXA scans of the plurality of subjects. Cropping portions of the DEXA scans may improve model performance by removing irrelevant information from the training data. For instance, if the model(s) are being trained to predict liver fat, then portions of the DEXA scan including an upper portion of a subject's head and/or a lower portion of a subject's legs may be less relevant than portions of the DEXA scan near the subject's torso given the location of the liver. Accordingly, including such portions may not improve model performance, or in some instances, may detract from model performance. The third portion of the DEXA scans illustrated in FIG. 2B have been pre-processed to crop 10% of the overall scan from a top portion and 25% of the overall scan from a bottom portion of a respective whole-body DEXA scan of each of the subjects. While FIG. 2B only illustrates the third portion as having been cropped to remove 10% of the overall scan from a top portion and 25% of the overall scan from a bottom portion, it should be understood that all three portions may be cropped to remove one or more additional portions of the respective whole-body DEXA scan.

Pre-processing the DEXA scans may additionally or alternatively include adding noise to one or more of the plurality DEXA scans of the plurality of subjects. Adding noise to the data prior to training may improve model performance by training the model(s) to learn the underlying patterns in the training data (e.g., as opposed to memorizing specific instances). The noise added to the DEXA scans may include, for example, rotation of the DEXA scan, translation of the DEXA scan (i.e., shifting the image in one direction or another without rotation), or a combination thereof. In some embodiments, each whole-body DEXA scan may be rotated by any number of degrees about any axis of rotation. The axis of rotation may be a point on the DEXA scan image, or a point outside the DEXA scan image. Each whole-body DEXA scan may be rotated at random independently of any of the other DEXA scans (i.e., each DEXA scan may be randomly rotated about by a different degree and about a different axis of rotation from any of the other DEXA scans). In some embodiments, each whole-body DEXA scan may be translated in any direction by any amount. Each whole-body DEXA scan may be translated at random independently of any of the other whole-body DEXA scans (i.e., each DEXA scan may be randomly translated by a different amount and/or in a different direction from any of the other DEXA scans). In some embodiments, each DEXA scan is rotated the same magnitude of degrees as each of the other DEXA scans but about a different axis of rotation compared to each of the other DEXA scans. In some embodiments, each DEXA scan is translated the same magnitude as each of the other DEXA scans but in a different direction compared to each of the other DEXA scans.

In some embodiments, the machine-learning models may include only one channel. Likewise, in some embodiments, the DEXA scans used to train the models may similarly include only one portion. FIG. 2C illustrates a training data set in which a DEXA scan for a first subject A includes a single portion and a DEXA scan for a second subject B includes a single portion. In some embodiments, the DEXA scan portion for subject A and subject B may each correspond to a portion of a DEXA scan obtained at a first X-ray energy that is primarily absorbed by soft tissue (e.g., fat and muscle). In some embodiments, the DEXA scan portion for subject A and subject B correspond to a portion of a DEXA scan obtained at a second X-ray energy that is absorbed more readily by hard tissue (e.g., bone) than soft tissue. In some embodiments, the DEXA scan portion for subject A and subject B is obtained by altering, combining, averaging, or otherwise manipulating one or both a DEXA scan portion obtained at a first X-ray energy and a portion obtained at a second energy level. For instance, the single portion input into the model may be a composite of the high energy and low energy DEXA scans respectively targeting soft and hard tissue. The single-portion DEXA scan images may be assigned ground truth adiposity scores including a ground-truth liver fat estimate such as a ground-truth PDFF score, a ground-truth VAT score, a ground-truth SAT score, and/or a ground-truth GFAT score. The single-portion DEXA scan images may be preprocessed according to any of the pre-processing methods described above with reference to FIG. 2B.

Example Training Corpus and Results

Figure 3A:
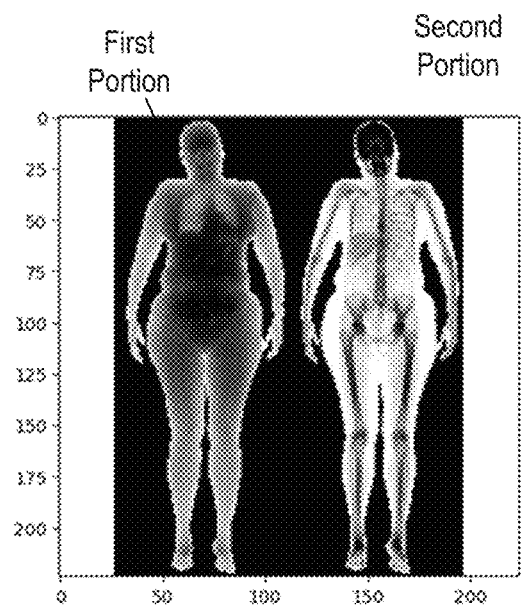
FIGS. 3A and 3B illustrate exemplary training images used to train two machine-learning models according to some embodiments.
Figure 3B:
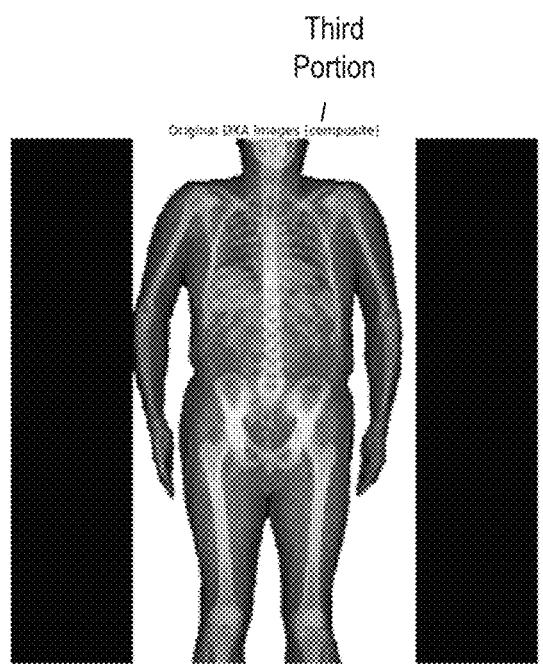

In an exemplary implementation, exemplary embodiments of the machine-learning models described herein were trained using a corpus of DEXA scans obtained from the UK Biobank. A corpus of DEXA scans obtained from the UK Biobank included whole-body scans for 28,908 subjects. FIGS. 3A and 3B illustrate exemplary training images used to train the machine-learning models. FIG. 3A illustrates an exemplary DEXA scan obtained of a subject obtained from the UK biobank including a first and second portion associated with high and low energy X-rays as described throughout. FIG. 3B illustrates a third portion of the DEXA scan that was obtained as a composite of the first and second portion to input into a third channel of the machine-learning model(s). The corpus was split into a training set of DEXA scans for 23,126 subjects, a validation set of DEXA scans for 2,890 subjects, and a test set of DEXA scans for 2,892 subjects. Subsequently, two additional test sets comprising DEXA scans for 925 subjects and 1,875 subjects, respectively, were obtained. In some embodiments, any number of test sets may be provided, for instance, according to an exemplary implementation, the aforementioned test sets were combined into a single test set of 5,692 samples. The R-squared score on this combined/pooled set of test subjects was 0.635.

Two deep learning architectures, ResNet-50 and EfficientNet-B0, were obtained as pretrained models and retrained/finetuned using the training set to predict PDFFs and other adiposity measures including VAT, SAT, and GFAT based on input DEXA scans. The DEXA scan images in the training set were preprocessed by cropping the images to remove 10% of the image from the top and 25% of the image from the bottom (corresponding to a respective portion of the head and legs of the subject, as described above). The images were further rescaled to 320×320 pixels and rotated about a randomly selected axis of rotation by 10 degrees and translated in a randomly selected direction by 5%.

After training, the ResNet-50 and EfficientNet-B0 models were evaluated using the three test sets. An R-squared statistic was used as the primary measure of performance of the respective models. The EfficientNet-B0 model performed better relative to the ResNet-50 at predicting liver fat for each of the test sets, achieving an R-squared score of 0.65, 0.61, and 0.64, respectively, for the three test sets. These results indicate that approximately 62% to 65% of the variance in the liver fat content could be explained by the models described herein, suggesting a substantial correlation between the predicted and actual values (rho~0.8). These findings underscore the potential of using deep learning techniques, in conjunction with DEXA scans, as a non-invasive and accurate method for estimating liver fat content.

Model Interpretation Using Saliency Maps

Figure 4:
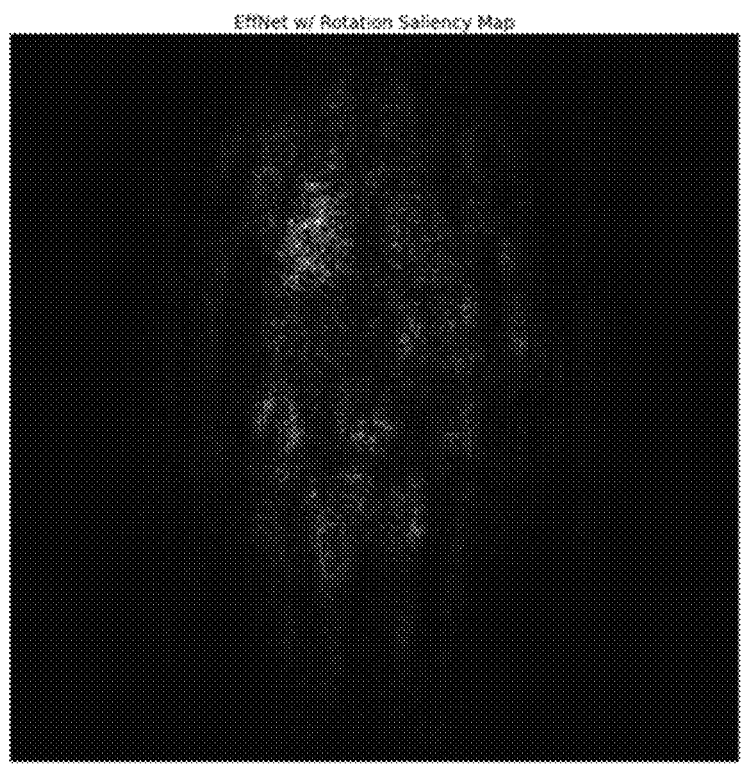
FIG. 4 illustrates a saliency map according to some embodiments.

FIG. 4 illustrates an exemplary saliency map indicating which parts of the input DEXA scans were most important for the EfficientNet-B0 machine-learning model's prediction. A saliency map is a visual representation of the relatively more important regions within input data (i.e., those regions that contribute significantly to the model's output). The saliency map illustrated in FIG. 4 highlights regions that were more influential to the EfficientNet-B0 model's output in red, and those regions that were less influential to the model's output are shown in black. As shown, the saliency map highlights a variety of regions of the scan, indicating that the model utilizes data from different parts of the human body. However, a clear cluster is highlighted in the upper-left quadrant associated with the location of the subject's liver, indicating that the model's prediction of liver fat of a patient is influenced by, data associated with the liver. This is bolstered by the results of the masking study discussed below, which masks different areas of the images in the training and validation set to identify the importance of the liver area to the machine-learning model(s).

Exemplary Masking Study

Figure 5A:
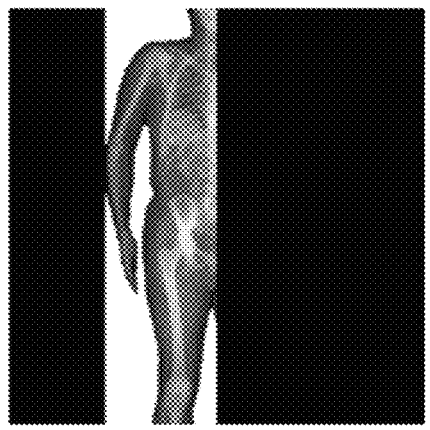
FIGS. 5A-5F illustrate image data used in a masking study according to some embodiments.
Figure 5B:
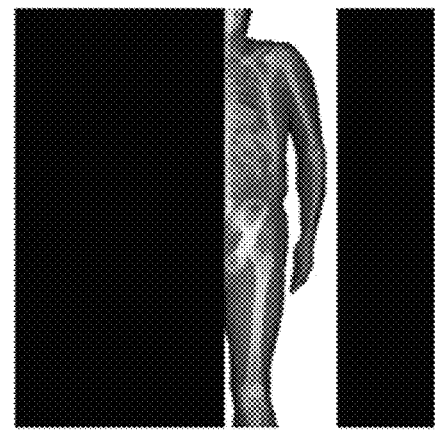
Figure 5C:
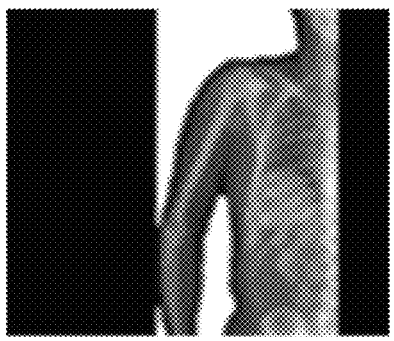
Figure 5D:
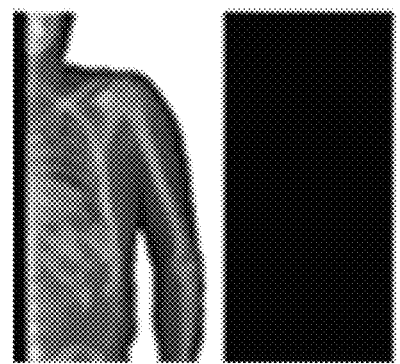
Figure 5E:
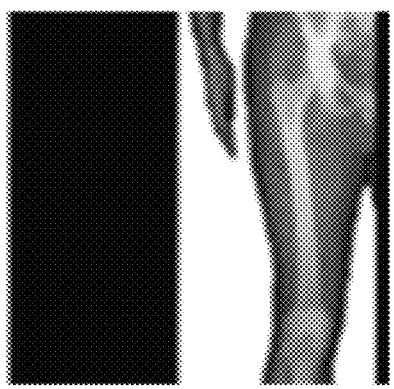
Figure 5F:
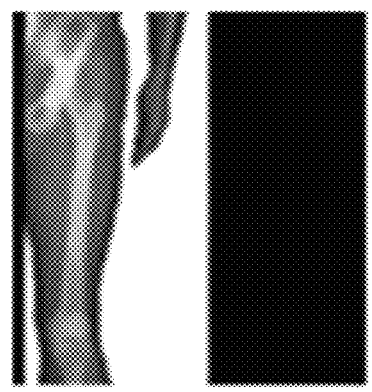

FIGS. 5A and 5B illustrate exemplary training data used in a masking study to determine the importance of the liver area to the machine-learning model(s) described herein. During the masking study, an area of the DEXA scan images in a training set and a validation set were masked. The model(s) were trained with the masked images and then prediction performance was tested on a validation set. FIG. 5A illustrates a training image in which only the left part of the image is retained and used for training and testing (left side) and FIG. 5B illustrates a training image only the right part of the image is retained and used for training and testing. In addition to left and right masking, training images in which only one of four quadrants of the image were retained and used for training and testing were obtained. FIGS. 5C-5F illustrate exemplary training images of each of the respective quadrants. FIG. 5C illustrates the upper left quadrant (including the liver). FIG. 5D illustrates the upper right quadrant. FIG. 5E illustrates the lower left quadrant. FIG. 5F illustrates the lower right quadrant.

The results of the left-right, and quadrant-based masking studies are shown in Table 1 below. Table 1 includes the $R^2$ values for each model (e.g., a model trained using full-body DEXA scans, a model trained using left half DEXA scans, a model trained using right half DEXA scans, a model trained using top-right quadrant DEXA scans, and so on). Further, for each model, an $R^2$ value was obtained for a liver fat (LF) prediction, Visceral adipose tissue (VAT) prediction, subcutaneous adipose tissue (SAT), and gluteofemoral (GFAT) adipose tissue.

TABLE 1

Masking Study Results

| Model | LF ($R^2$) | VAT ($R^2$) | SAT ($R^2$) | GFAT ($R^2$) |
| --- | --- | --- | --- | --- |
| Full Image | 0.6183 | 0.9290 | 0.9312 | 0.8937 |
| Left Half | 0.5861 | 0.9494 | 0.9613 | 0.9366 |
| Right Half | 0.3154 | 0.9553 | 0.9556 | 0.9285 |
| Top-Right Quadrant | 0.3306 | 0.9444 | 0.9501 | 0.8447 |
| Top-Left Quadrant | 0.5783 | 0.9407 | 0.9480 | 0.8485 |
| Bottom-Left Quadrant | 0.3112 | 0.8596 | 0.9067 | 0.9144 |
| Bottom-Right Quadrant | 0.3172 | 0.8612 | 0.9095 | 0.9196 |

As shown, the best performing model overall for liver fat prediction was trained using full-body DEXA scans. However, the results provided in Table 1 further illustrate that, when the liver area is retained in the images, the models perform better than when the liver area is not retained in the images. That is, the model's quantification of liver fat is more accurate when trained based on images of the left side in the left-right experiment, and when the model is trained using images of the top left quadrant in the quadrant-based experiment. This demonstrates that the model is utilizing liver data in predicting liver fat of a patient, rather than simply predicting liver fat based on overall body composition.

Figure 6:
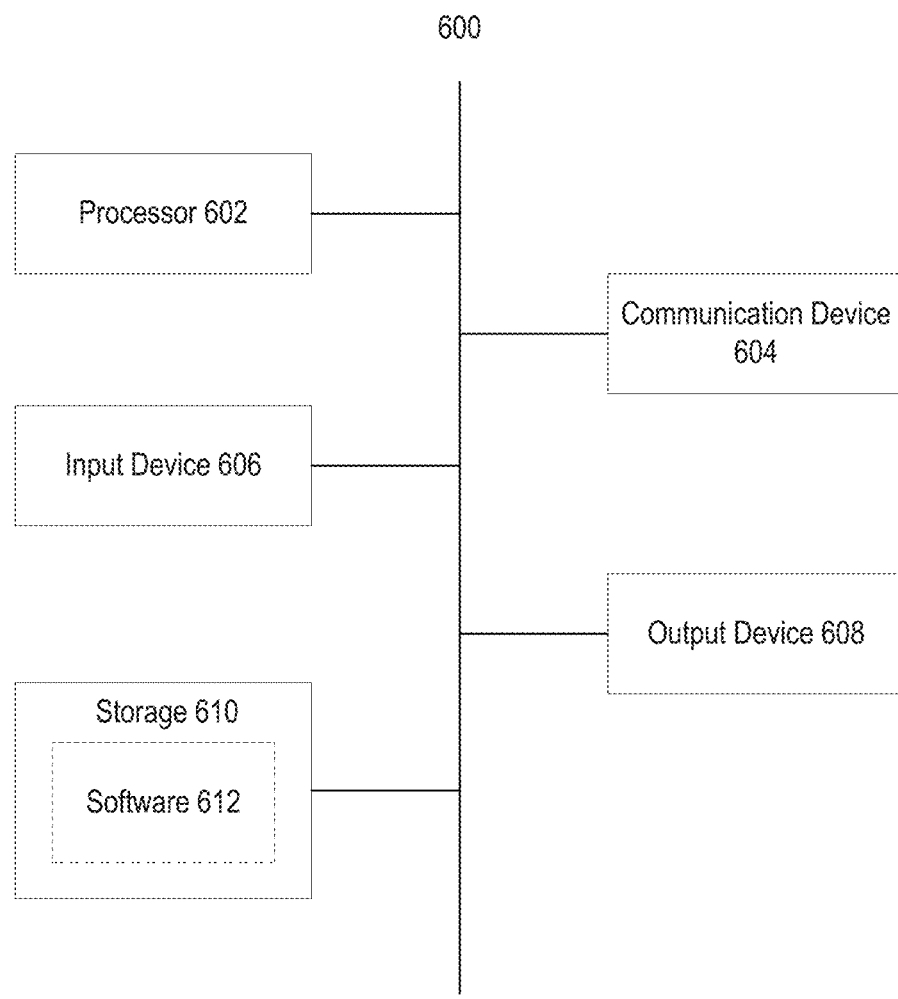
FIG. 6 illustrates an exemplary computing system according to some embodiments.

FIG. 6 depicts an exemplary computing device 600, in accordance with one or more examples of the disclosure. Device 600 can be a host computer connected to a network. Device 600 can be a client computer or a server. As shown in FIG. 6, device 600 can be any suitable type of microprocessor-based device, such as a personal computer, workstation, server, or handheld computing device (portable electronic device) such as a phone or tablet. The device can include, for example, one or more of processors 602, input device 606, output device 608, storage 610, and communication device 604. Input device 606 and output device 608 can generally correspond to those described above and can either be connectable or integrated with the computer.

Input device 606 can be any suitable device that provides input, such as a touch screen, keyboard or keypad, mouse, or voice-recognition device. Output device 608 can be any suitable device that provides output, such as a touch screen, haptics device, or speaker.

Storage 610 can be any suitable device that provides storage, such as an electrical, magnetic, or optical memory, including a RAM, cache, hard drive, or removable storage disk. Communication device 604 can include any suitable device capable of transmitting and receiving signals over a network, such as a network interface chip or device. The components of the computer can be connected in any suitable manner, such as via a physical bus or wirelessly.

Software 612, which can be stored in storage 610 and executed by processor 602, can include, for example, the programming that embodies the functionality of the present disclosure (e.g., as embodied in the devices as described above).

Software 612 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 610, that can contain or store programming for use by or in connection with an instruction execution system, apparatus, or device.

Software 612 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 612 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Figure 7:
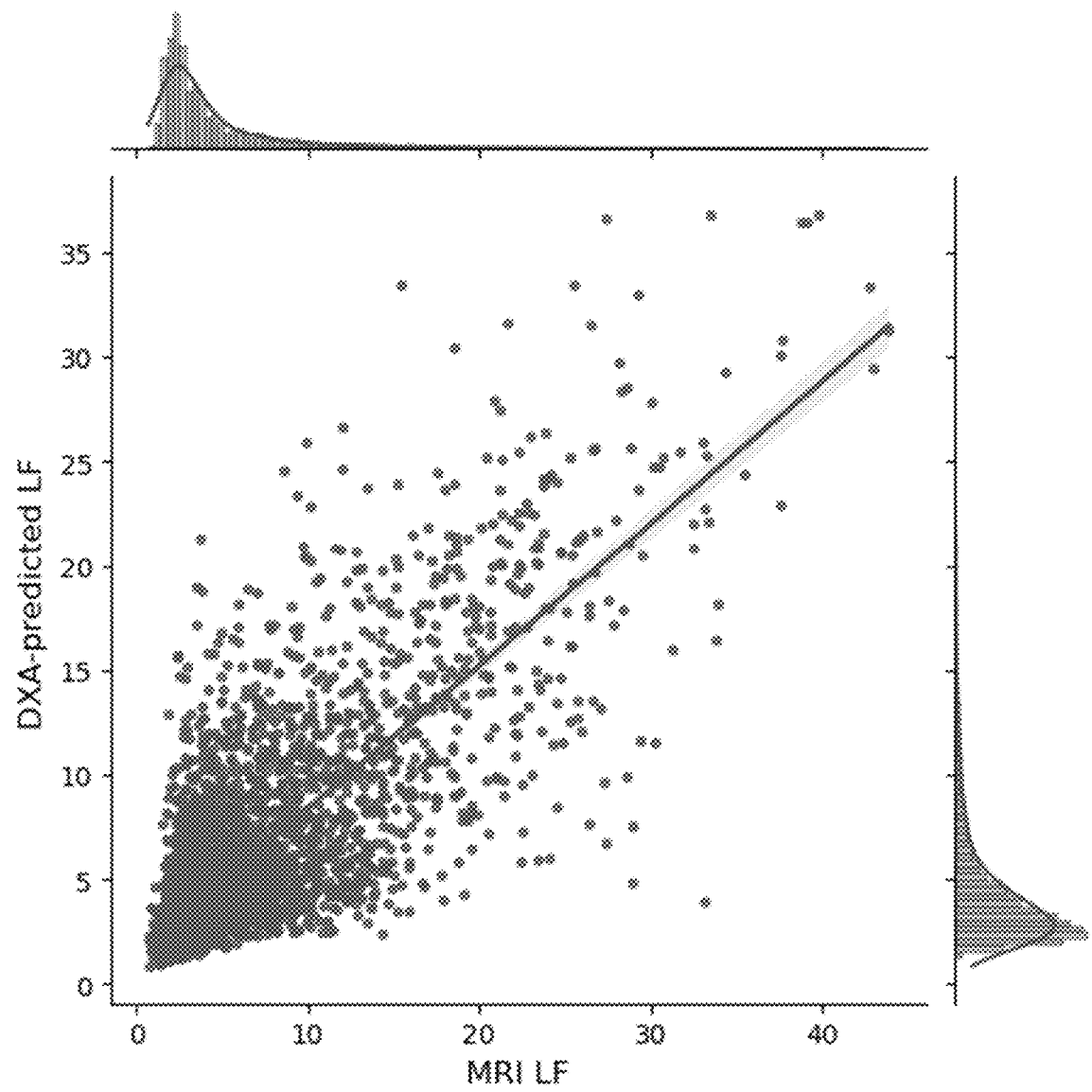
FIG. 7 illustrates a scatter plot of MRI-based liver fat scores and DEXA-predicted liver fat scores obtained based on test set samples according to some embodiments.

FIG. 7 illustrates a scatter plot of MRI-based liver fat scores and DEXA-predicted liver fat scores obtained based on test set samples according to some embodiments. As shown, the DEXA-predicted liver fat scores are highly accurate compared to MRI-based liver fat scores.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for predicting one or more adipose depots for a patient, the system comprising one or more processors, memory, and one or more programs stored in the memory for execution by the one or more processors, the one or more programs including instructions that when executed by the one or more processors cause the system to:
   receive one or more Dual-energy X-ray Absorptiometry (DEXA) scans comprising at least a portion of a torso of the patient;
   provide at least one or more portions of the one or more DEXA scans to a trained machine-learning model, wherein the machine-learning model is trained using a training dataset comprising: a plurality of training DEXA scans of a plurality of subjects and a plurality of Magnetic Resonance Imaging (MRI)-image-based adiposity scores of the plurality of subjects and wherein the adiposity scores of the plurality of subjects are based on a plurality of MRI images of the plurality of subjects; and
   predict the one or more adipose depots for the patient utilizing the trained machine-learning model.

2. The system of claim 1, wherein the predicted one or more adipose depots for the patient comprises an estimated Proton Density Fat Fraction (PDFF) for the patient.

3. The system of claim 1, the one or more programs including instructions that when executed by the one or more processors cause the system to: obtain a diagnosis of a disease based on the predicted one or more adipose depots of the patient.

4. The system of claim 1, the one or more programs including instructions that when executed by the one or more processors cause the system to: monitor a progression of the disease based on the predicted one or more adipose depots of the patient.

5. The system of claim 3, wherein the disease comprises Non-Alcoholic Fatty Liver Disease (NAFLD) or Non-Alcoholic Steatohepatitis (NASH), liver cirrhosis and/or liver cancer.

6. The system of claim 1, wherein the one or more DEXA scans comprising at least a portion of a torso further comprise at least a portion of the head, and at least a portion of the legs of the patient.

7. The system of claim 1, wherein the one or more adipose depots comprises liver fat.

8. The system of claim 1, the one or more programs including instructions that when executed by the one or more processors cause the system to: identify a treatment for the patient based on the predicted one or more adipose depots of the patient.

9. The system of claim 1, wherein the trained machine-learning model comprises a trained neural network model.

10. The system of claim 1, wherein the machine-learning model is trained by:
    obtaining a pretrained version of the machine-learning model; and
    training the pretrained version of the machine-learning model using the training dataset.

11. The system of claim 1, wherein the MRI-image-based adiposity scores of the plurality of subjects comprise a liver fat estimate, an estimated Visceral adipose tissue (VAT)

score, an estimated subcutaneous adipose tissue (SAT) score, an estimated gluteofemoral (GFAT) adipose tissue score, or any combination thereof.

12. The system of claim 1, wherein the MRI-image-based adiposity scores of the plurality of subjects comprise liver fat estimates.

13. The system of claim 1, wherein the plurality of training DEXA scans of the plurality of subjects are obtained by:
  obtaining a plurality of whole-body DEXA scans of the plurality of subjects;
  cropping a top portion and a bottom portion off each whole-body DEXA scan of the plurality of whole-body DEXA scans of the plurality of subjects; and
  adding noise to one or more of the plurality of cropped whole-body DEXA scans of the plurality of subjects.

14. The system of claim 1, wherein the plurality of training liver fat estimates comprises a plurality of PDFF scores for the plurality of subjects.

15. The system of claim 14, wherein at least one PDFF score of the plurality of PDFF scores is obtained based on an MRI image of a subject of the plurality of subjects.

16. The system of claim 14, wherein the at least one PDFF score of the plurality of PDFF scores is obtained by inputting the MRI image of the subject of the plurality of subjects into a trained regression model.

17. The system of claim 1, wherein providing at least one or more portions of the one or more DEXA scans to the trained machine-learning model comprises:
  receiving a first portion of a DEXA scan of the patient;
  receiving a second portion of the DEXA scan of the patient;
  obtaining a composite DEXA scan based on the first portion and the second portion of the DEXA scan; and
  providing the first portion of the DEXA scan, the second portion of the DEXA scan, and the composite DEXA scan across a plurality of channels of the trained machine-learning model.

18. The system of claim 1, wherein the portion of the torso of the patient comprises at least a liver of the patient.

19. A non-transitory computer-readable medium storing instructions for predicting one or more adipose depots for a patient, wherein the instructions are executable by a system comprising one or more processors to cause the system to:
  receive one or more Dual-energy X-ray Absorptiometry (DEXA) scans comprising at least a portion of a torso of the patient;
  provide at least one or more portions of the one or more DEXA scans to a trained machine-learning model, wherein the machine-learning model is trained using a training dataset comprising: a plurality of training DEXA scans of a plurality of subjects and a plurality of Magnetic Resonance Imaging (MRI)-image-based adiposity scores of the plurality of subjects and wherein the adiposity scores of the plurality of subjects are based on a plurality of MRI images of the plurality of subjects; and
  predict the one or more adipose depots for the patient utilizing the trained machine-learning model.

20. A method for predicting one or more adipose depots for a patient, comprising:
  receiving one or more Dual-energy X-ray Absorptiometry (DEXA) scans comprising at least a portion of a torso of the patient;
  providing at least one or more portions of the one or more DEXA scans to a trained machine-learning model, wherein the machine-learning model is trained using a training dataset comprising: a plurality of training DEXA scans of a plurality of subjects and a plurality of Magnetic Resonance Imaging (MRI)-image-based adiposity scores of the plurality of subjects and wherein the adiposity scores of the plurality of subjects are based on a plurality of MRI images of the plurality of subjects; and
  predicting the one or more adipose depots for the patient utilizing the trained machine-learning model.

* * * * *